United States Patent Office 2,988,579
Patented June 13, 1961

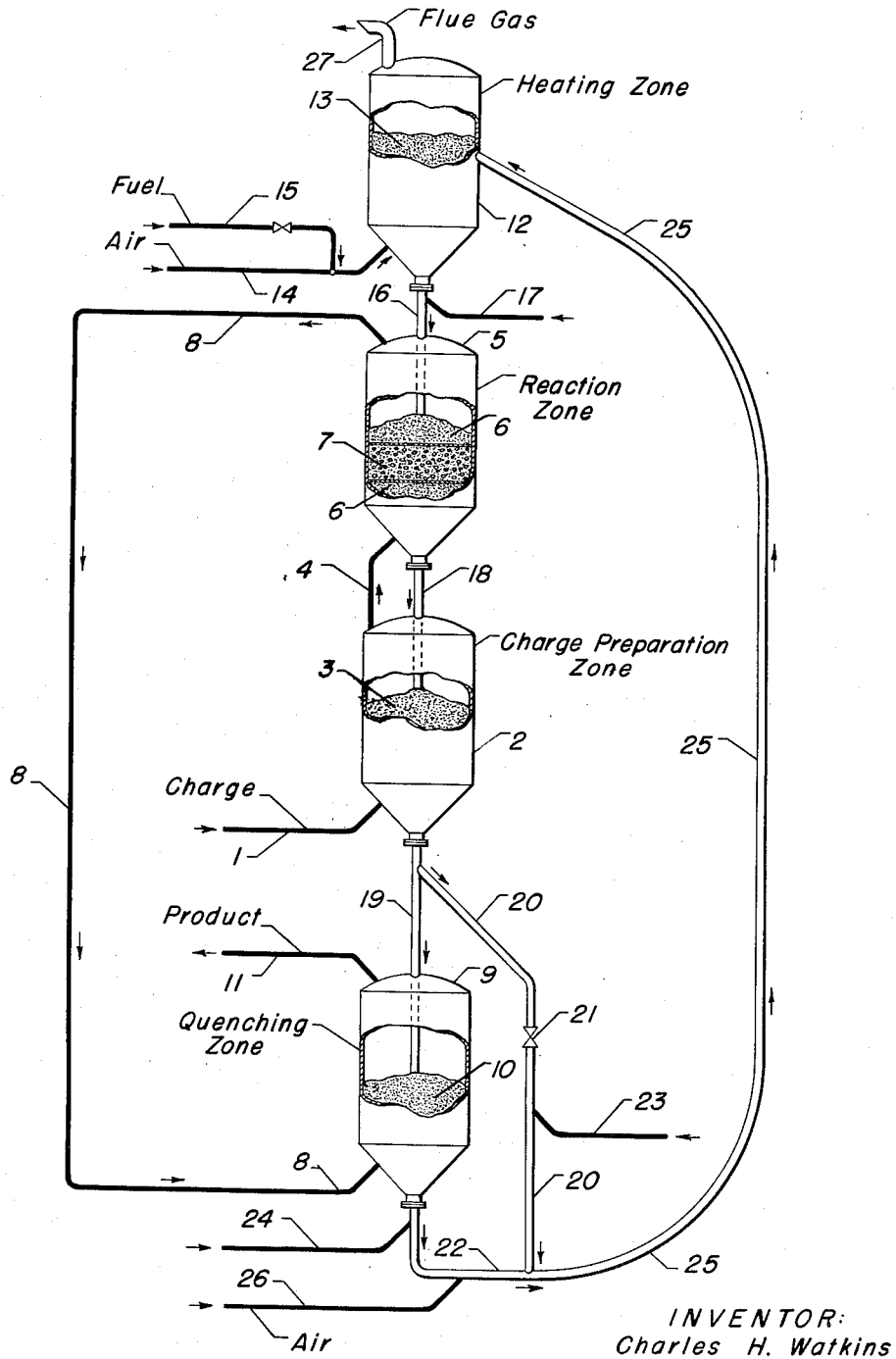

2,988,579
METHOD FOR PRODUCING UNSATURATED HYDROCARBONS
Charles H. Watkins, Arlington Heights, Ill., assignor, by mesne assignments, to Universal Oil Products Company, Des Plaines, Ill., a corporation of Delaware
Filed Oct. 29, 1958, Ser. No. 770,269
2 Claims. (Cl. 260—683.3)

The present invention relates to a process for producing unsaturated hydrocarbons, and is specifically directed to a process for producing low molecular weight olefinic and acetylenic hydrocarbons from a substantially saturated hydrocarbon or mixture of hydrocarbons. The method of the present invention is particularly adaptable for the production of unsaturated hydrocarbons containing from about two to about four carbon atoms.

Unsaturated hydrocarbons, particularly those of low molecular weight such as acetylene, ethylene, propylene, butylene, etc., find widespread use either in and of themselves, or as reactants in processes for the production of other hydrocarbons, or, in some instances, in the production of various petrochemicals. Acetylene is extensively employed as a component fuel for welding; ethylene and propylene are widely utilized as the starting material for polymerization and/or alkylation processes which are designed to produce such useful products as polyethylene, gasoline, alkyl aromatics, detergents, etc.

Unsaturated hydrocarbons are commonly produced by either hydrocracking or dehydrogenating reactions, or in a single process which combines both reactions, while processing saturated hydrocarbons which are abundantly available from many sources, and particularly from petroleum crude. For example, if hexene is the product ultimately desired, a substantially pure stream comprising dodecane may be cracked, each molecule of the latter forming thereby two molecules of hexene. Generally, however, the usual procedure is to subject a hydrocarbon fraction of a wide boiling range to hydrocracking and dehydrogenating conditions, recovering therefrom a broad variety of unsaturated products.

Generally, the experience has been that long-chain, high-boiling molecules are more easily cracked than the short-chain, low molecular weight molecules, and the large molecules of the unsaturated product from the former are extremely stable, and when formed, do not possess the tendency to crack further, forming short-chain, low molecular weight molecules. In producing unsaturated hydrocarbons, such as acetylene, ethylene and propylene, that is, unsaturated hydrocarbons of low molecular weight, the major difficulty revolves around the fact that an excessively high temperature is required for the formation of the molecules containing about four carbon atoms or less, and these molecules are found to be unstable at temperatures substantially below the high temperature required for their formation. That is, a temperature in excess of about 1800° F. is required for the formation of propylenes and butylenes, etc., but the same compounds are unstable at temperatures within the range of from about 1000 to about 1800° F. It is seen that the overall effect is the existence of a temperature range in which the ultimate product is unstable, but through which the product must necessarily be brought in order to preserve the material formed at a temperature in excess of the unstable range.

A method currently practiced, to a great extent, for the purpose of lowering the temperature of the ultimate product while retaining the particular components thereof, comprises a rapid quench which utilizes water, and results in a cooled product accompanied by the production of steam. Such a method requires an abundant source of water which is substantially completely free from impurities, and an extraneous system for the conversion of the steam into water permitting the recycle of the latter as the quenching medium. Further, there is required a separation procedure for the purpose of recovering unsaturated hydrocarbons which are virtually free from water. In addition there is a tremendous quantity of heat lost at high temperature, which loss is not sufficiently counterbalanced by the result produced.

The object of the present invention is to provide a specific combination process especially adapted to the production of low molecular weight unsaturated hydrocarbons, which process eliminates the necessity for the utilization of large quantities of uncontaminated water for the purpose of insuring the stability of the desired product while the temperature thereof is being reduced through the range at which the products are unstable. The process of the present invention utilizes a fixed-bed of a suitable dehydrogenation catalyst, heated by a continuous supply of hot, inert, non-contaminating, reaction-resistant particles, which particles also furnish the heat required for raising the temperature of the material charged to the process, and subsequently provide an extremely efficient quenching means which retains high-temperature heat within the process.

In one embodiment, the present invention relates to a method for producing unsaturated hydrocarbons through the introduction of a substantially saturated hydrocarbon charge into a feed-preparation zone, containing inert particles at a temperature within the range of from about 1400° F. to about 2000° F., and causing the saturated hydrocarbon charge to contact the inert particles, thereby raising the temperature of the charge to a level not in excess of 1800° F. The resultant vaporous hydrocarbon is passed into a reaction zone containing a fixed-bed of dehydrogenation catalyst, through which catalyst hot inert particles are continually passing countercurrent to the vaporous hydrocarbon while supplying the heat required to effect the dehydrogenation and/or hydrocracking of the vaporous saturated hydrocarbon. The resulting unsaturated hydrocarbons are passed into a quench zone, and caused to contact the inert particles from the feed-preparation zone, thereby rapidly decreasing the temperature of the latter through the unstable temperature range. The inert particles are thereafter passed into a heating zone with air, in the presence of a suitable combustible material, wherein they are brought to a temperature in excess of the necessary reaction temperature, and subsequently passed into the reaction zone.

In a more specific embodiment, the method of the present invention provides a process for the production of unsaturated hydrocarbons containing from about two to about four carbon atoms, which method comprises introducing a substantially saturated hydrocarbon charge stock into a feed preparation zone which contains inert particles at a temperature within the range of about 1400° F. to about 2000° F. and causing said saturated hydrocarbons to contact the inert particles, thereby raising the temperature of the former to a level not greater than 1800° F. The resulting vaporous saturated hydrocarbons are passed into a reaction zone containing a fixed bed of dehydrogenation catalyst which is maintained at a temperature of about 1800° F. to about 2200° F., and through which dehydrogenation catalyst the inert particles are passing countercurrently to said vaporous hydrocarbons. The resulting unsaturated hydrocarbons, at a temperature in excess of 1800° F., are passed into a quench zone wherein they are caused to contact the inert particles passing into said quench zone from the feed preparation zone. The inert particles are employed in an amount which is sufficient to decrease the temperature of the unsaturated hydrocarbons to a level below about 1000° F. The heated inert particles are thereafter introduced into a heating zone with air, in the presence of a combustible material, and thereafter passed at a temperature within the range of 1800° F. to about 2200° F. into the reaction zone containing the dehydrogenation catalyst.

The process of the present invention may be more clearly described, and is readily understood through reference to the accompanying figure. For the sake of simplification, non-essential appurtenances such as heaters, valves, controls, pumps, condensers, etc. have been eliminated from the drawing. These are standard equipment, and are easily recognized, where necessary, by those possessing a reasonable degree of knowledge and skill in the art. It is understood that the present invention is not unduly limited to the particular embodiment illustrated; the scope of the present invention is intended to be defined by the breadth and spirit of the appended claims.

Referring now to the drawing, the particular equipment employed in the process of the present invention is illustrated as four vertically disposed, interconnected and closed vessels. The uppermost vessel 12 defines a heating zone wherein air and fuel are burned, and fluidized inert particles are brought thereby to a temperature within the range of 1800° F. to 2200° F., and preferably, from about 2000° F. to about 2200° F. The next lower vessel defines a reaction zone 5 wherein the hydrocarbon charge is caused to contact a fixed bed of dehydrogenation catalyst 7, the hydrocarbons rising countercurrent to the descending stream of hot, inert particles 6. The next succeeding lower vessel defines feed-preparation zone 2, in which zone the hydrocarbon charge is vaporized and preheated to a temperature just below the reaction temperature of 1800° F. The lowermost vessel defines the quench zone 9 wherein the reaction products from reaction zone 5 are quenched to a lower temperature by direct contact with the comparatively cold inert particles existing therein as a fluidized bed 10.

Heated solid inert particles 13 flow downwardly from heater zone 12 into reaction zone 5, and furnish the required quantity of heat for the reactions necessarily to be effected therein. Subsequently, the inert particles flow downwardly from reaction zone 5 into charge preparation zone 2, being employed therein as fluidized, fixed bed 3, effecting the preheating of the particular hydrocarbon material being charged to the process. The solid inert particles continue to flow downwardly into quenching zone 9, and are heated to a certain extent therein by quenching the unsaturated hydrocarbon products from reaction zone 5. The inert solids leaving quenching zone 9 are returned to heating zone 5 through line 22 and external conduit 25, being carried by an air stream entering through line 26.

A clear understanding of the function, and basic physical construction, of the four vertically disposed vessels is facilitated by describing them individually. A combustible fuel entering through line 15 contacts, and is intermixed with, air in line 14, the mixture being burned in heating zone 12 while in direct contact with fluidized inert particles 13. The gaseous material resulting from the combustion is removed from heating zone 12 via flue gas vent 27. The fluidized solids, which originally entered heating zone 12 through external conduit 25, descend through line 16, are stripped of entrained flue gas through the use of a suitable stripping medium from line 17, and enter reaction zone 5 at a temperature within the range of about 1800° F. to about 2200° F., and preferably between about 2000° F. and 2200° F.

The hot inert solids descend into reaction zone 5 and form a cover 6 over the fixed bed of dehydrogenation catalyst 7; they furnish the required quantity of heat necessary to effect the desired reactions. Preheated, vaporous hydrocarbon charge enters the bottom of reaction zone 5 through line 4 and passes through the alternating layers of inert particles 6 and dehydrogenation catalyst 7, leaving the upper portion of reaction zone 5 through external conduit 8.

The inert particles are transported from reaction zone 5 into feed preparation zone 2 via conduit 18, and form a fluidized, fixed bed 3. The hydrocarbon charge to the process enters feed-preparation zone 2 through line 1, and is heated to a temperature not in excess of 1800° F. by passing upwardly through fluidized bed 3. The vaporized hydrocarbon charge is removed from the feed preparation zone through line 4 into reaction zone 5.

The solid inert particles are removed from feed-preparation zone 2 through conduit 19 into quenching zone 9, and form a fluidized, fixed bed 10. Bypass line 20, containing valve 21, around quenching zone 9, is provided for the purpose of controlling the quantity of inert particles entering quenching zone 9. The inert particles bypassing quenching zone 9 are stripped of entrained gases through the use of a suitable stripping gas in line 23. The cooled inert particles are removed from quenching zone 9 through line 22 in which they are stripped of product gases by a suitable stripping gas entering through line 24. Air is fed through line 26, contacts the inert particles in line 22 and transfers them through external conduit 25 into heating zone 12. The vaporized unsaturated hydrocarbon products from reaction zone 5 enter quenching zone 9 through line 8 at a temperature in excess of 1800° F. Through contact with fluidized bed 10, the hydrocarbons are cooled to a temperature below 1000° F., and are removed from the quenching zone through line 11.

The charge stock entering the process through line 1 may be a substantially pure gaseous hydrocarbon such as methane, ethane, propane, butane, etc., or liquid hydrocarbons as heavy as asphalt or other residuum. The charge may be some intermediate substantially pure saturated hydrocarbons, or a mixture of saturated hydrocarbons. In the situation involving the heavy asphaltic charge, an excessive quantity of coke and other carbonaceous material is deposited upon the inert solid particles. This carbonaceous material, which is deposited in reaction zone 5, feed preparation zone 2 and quenching zone 9, is removed by combustion with air in external conduit 25, and heating zone 12. The carbonaceous material is removed as a product of combustion on the flue gas through conduit 27.

The heating zone may be an ordinary insulated pressure vessel capable of withstanding the pressure and temperature of the process being effected therein. The heating zone contains a fixed, fluidized bed of solid, dense, inert and temperature-stable heat-retaining particles. These particles are subjected to elevated temperatures through contact with hot gas or by the direct burning of fuel and air within the fluidized bed of the particles. In the latter instance, fuel and air are introduced into the heating zone at ignition temperature, being withdrawn therefrom along with the aforementioned gaseous combustion products. When the particular hydrocarbon charge to the process is of such a nature as to undergo thermal conversion to coke or other carbonaceous material, which becomes deposited on the inert solid particles, the heating of these particles may be at least partially effected through the burning of this deposit from the surface of the particles. This burning is readily effected through the introduction of excess air, that is, more air than is required to burn the combustible fuel.

The particles of heat-retaining inert materials may comprise sand, clay, limestone, metallic pellets such as nickel, iron, stainless steel, copper. etc. The particles are best described, however, through reference to their essential physical characteristics, and are not intended to be limited to those hereinabove set forth. The particles are selected from any material which is temperature insensitive, or inert at the temperatures experienced at the various stages of the process. Further, the particles are chemically inert with respect to the various process streams with which they are caused to contact. The particles are of a size such that they are readily moved from one zone to another either by gravity or physical entrainment in a fluidized stream; the size must be sufficiently small to permit percolation through a bed of catalyst maintained within at least one of the various zones of the process, while at the same time being sufficiently dense so as to be subject to hindered settling against a countercurrent stream of gas.

As hereinabove set forth, the hot inert particles are passed from the heating zone into the reaction zone wherein a fixed bed of a suitable dehydrogenation catalyst is maintained. The catalyst bed is composed of particles of a size, and disposed in a manner, such that the hot inert particles are permitted to percolate therethrough, either concurrently, or countercurrently to the stream of hydrocarbon vapors passing through the reaction zone. To facilitate the operation of the process, it is preferred that the inert particles flow continuously downward, countercurrent to the flow of the vaporized hydrocarbon, the only exception being the flow from the quenching zone through the external conduit into the heating zone by means of the airlift. The presence of the hot inert particles in the reaction zone supplies the necessary temperature and heat of reaction for the process being effected. The quantity of heat may be varied and controlled by varying the temperature of the particles or by varying the quantity of the hot inert particles passing through the reaction zone. The control may be manual or automatic, and is required to maintain the desired temperature condition within the reaction zone.

The reaction zone may be an ordinary enclosed pressure vessel which is suitably insulated and adapted to hold a fixed bed of catalyst in which the above described contact of reactants is effected. The catalyst is preferably iron oxide, chromia, alumina, molybdena, silica-alumina, or other catalysts well known for their ability to promote the hydrocracking and dehydrogenation reactions. The temperature within the reaction zone is maintained within the range of 1800° F. to about 2200° F., and preferably between about 2000° F. and 2200° F. The reaction zone is provided with suitable means for removing the heat retentive particles therefrom and introducing the latter into the feed-preparation zone. The catalyst may be arranged as an ordinary fixed bed of particles which are sufficiently large to enable the percolation of the heat retentive inert particles therethrough. Where necessary, distinct channels may be provided to facilitate the flow of the inert particles.

The inert particles leaving the reaction zone, are cooled to a temperature below about 1000° F., and preferably below about 700° F. by supplying preheat to the hydrocarbon being charged into the feed-preparation zone. These comparatively cool inert particles are transferred to the quenching zone for the purpose of rapidly lowering the temperature of the unsaturated hydrocarbon product. As a result of the contact within the quenching zone, the unsaturated hydrocarbon product, with respect to the temperature thereof, is rapidly taken through the range in which the product is unstable. Through the utilization of a quenching zone, which employs substantially cool inert particles, heat which is directly re-employed within the process is recovered without the accompanying contamination of the ultimate product, and without the necessity of handling, purification, and other difficulties generally associated with the use of an external coolant. This result is obtained through the use of two different, interdependent serial flows; that of the inert solid particles, and that of the particular hydrocarbon charged and produced within the process.

Briefly, the method of the present invention, when made applicable to the production of the various acetylenes and olefinic hydrocarbons such as ethylene, propylene, the butylenes, the pentenes, etc., consists of charging a substantially saturated hydrocarbon mixture to a charge-preparation zone containing a fluidized bed of hot inert particles of a mixture of sand and limestone. The inert particles are at a temperature of about 1800° F., and the temperature of the hydrocarbon charge is raised to a level below 1800° F. As hereinbefore set forth, the temperature of the inert particles will lie within the range of from about 1000° F. to about 1800° F.; in any event, the vaporous hydrocarbon leaving the feed-preparation zone will be at a temperature not in excess of 1800° F.

The vaporous hydrocarbons are passed into a reaction zone wherein they are caused to contact a fixed bed of dehydrogenation catalyst comprising iron oxide composited with an alumina-silica carrier material. The bed of catalyst is maintained at a temperature in excess of 1800° F. by virtue of the hot inert particles percolating therethrough, countercurrent to the rising hydrocarbon vapors. The substantially unsaturated hydrocarbon product, at a temperature in excess of 1800° F., is passed into a quench zone, and caused to contact therein the fluidized bed of inert particles from the feed-preparation zone. The inert particles are at a temperature below about 1000° F., and preferably below about 700° F., as a result of having supplied preheat to the hydrocarbon charge, and cause the unsaturated hydrocarbon product to be quenched rapidly to a temperature below 1000° F.

The vaporous hydrocarbons removed from the quenching zone may be subjected to any suitable separation scheme whereby the unreacted, saturated hydrocarbons are recovered and subsequently recycled to the feed-preparation zone. The inert particles, having coke and other carbonaceous material deposited thereon, are removed through the utilization of an air-lift to the heating zone. The coke and carbonaceous material is burned therefrom and vented as an off gas, while the temperature of the inert particles is being increased to a temperature of about 2000° F.

The process of the present invention, as herebefore set forth, and as hereinafter specifically claimed, is intended to be of sufficient scope to include insignificant modifications which will become readily ascertained by those possessing skill in the art. The invention is not intended to be limited unduly beyond the scope and spirit of the appended claims.

I claim as my invention:

1. A method for producing unsaturated hydrocarbons which comprises introducing a substantially saturated hydrocarbon charge stock into a feed-preparation zone containing inert particles at a temperature within the range of from about 1400° F. to about 2000° F., causing said saturated hydrocarbon to contact the inert particles, thereby raising the temperature of said hydrocarbon to a level not greater than 1800° F., passing the resultant vaporous hydrocarbon into a reaction zone containing a fixed-bed of dehydrogenation catalyst and passing heated inert particles through said bed countercurrently to said vaporous hydrocarbon, passing the resultant vaporous unsaturated hydrocarbons into a quenching zone, discharging the heated inert particles from said reaction zone into said feed preparation zone for contact in the latter zone with said saturated hydrocarbon as aforesaid, passing said inert particles from said feed preparation zone into said quenching zone, contacting therein said unsaturated vaporous hydrocarbons with the inert particles, recovering the resulting cooled unsaturated hydrocarbons and passing said inert particles from the quenching zone into a heating zone with air in the presence of a combustible material, and passing the resultant heated inert particles from the heating zone to said reaction zone in sufficient amount to maintain in the reaction zone a temperature of from about 1800° F. to about 2200° F.

2. The method of claim 1 further characterized in that the inert particles are passed into said quenching zone in an amount sufficient to decrease the temperature of said vaporous unsaturated hydrocarbons to below about 1000° F.

References Cited in the file of this patent
UNITED STATES PATENTS

| | | |
|---|---|---|
| 2,387,378 | Wolk | Oct. 23, 1945 |
| 2,443,673 | Atwell | June 22, 1948 |
| 2,750,420 | Hepp | June 12, 1956 |
| 2,885,343 | Woebcke | May 5, 1959 |
| 2,885,344 | Garbo | May 5, 1959 |